United States Patent [19]

Darwin et al.

[11] 3,764,658

[45] Oct. 9, 1973

[54] PRODUCTION OF FLUOSILICIC ACID

[75] Inventors: Charles D. Darwin, Lake Wales, Fla.; John D. Nickerson, Atlanta, Ga.; James E. Parsons, Lakeland, Fla.; Robert A. Wiesboeck, Stone Mountain, Ga.

[73] Assignee: United States Steel Corporation, Pittsburgh, Pa.

[22] Filed: Jan. 26, 1972

[21] Appl. No.: 220,893

[52] U.S. Cl. .................................................. 423/321
[51] Int. Cl. ............................................ C01b 25/16
[58] Field of Search ......................................
423/319–321

[56] References Cited
UNITED STATES PATENTS

| 3,615,195 | 10/1971 | Bierman et al. | 423/321 |
| 2,933,372 | 4/1960 | Manning | 423/321 |

*Primary Examiner*—Oscar R. Vertiz
*Assistant Examiner*—Gregory A. Heller
*Attorney*—Arthur J. Greif

[57] ABSTRACT

An improved process for the recovery of fluosilicic acid from recycle streams in the manufacture of phosphoric acid by the sulfuric acid digestion of phosphate ore.

7 Claims, 6 Drawing Figures

FLUORINE EVALUATION VERSUS F/Si
(10 % DISTILLATION AT 8 IN. VACUUM)

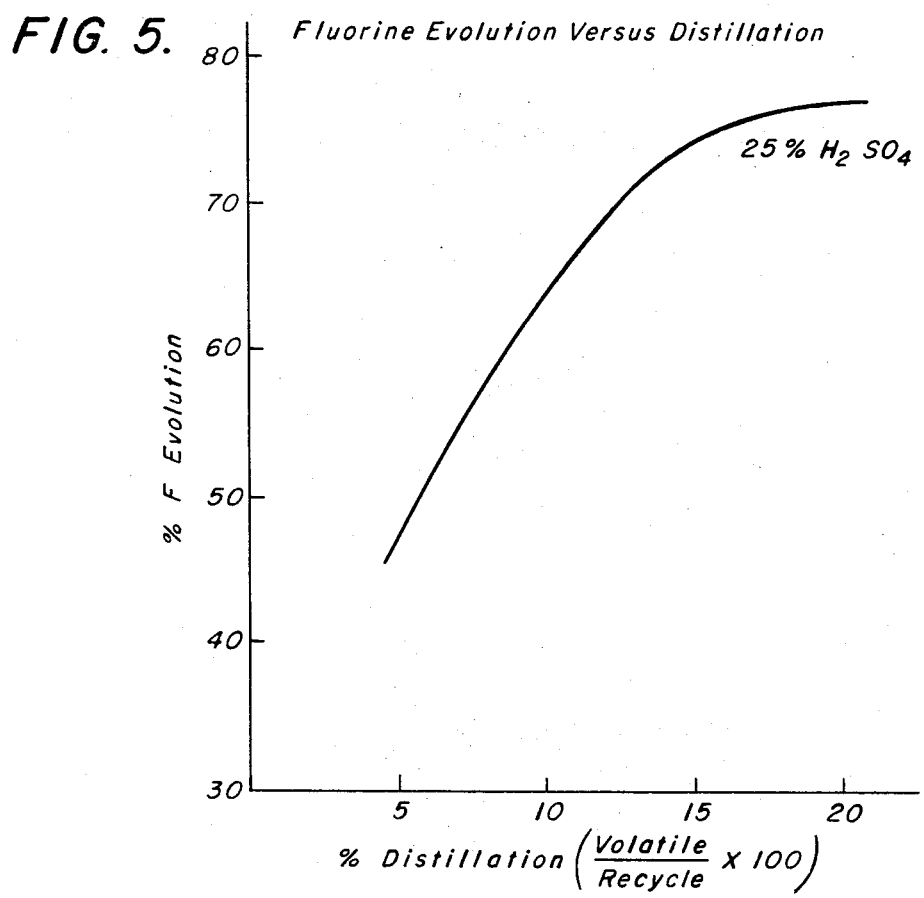
FIG. 5. Fluorine Evolution Versus Distillation
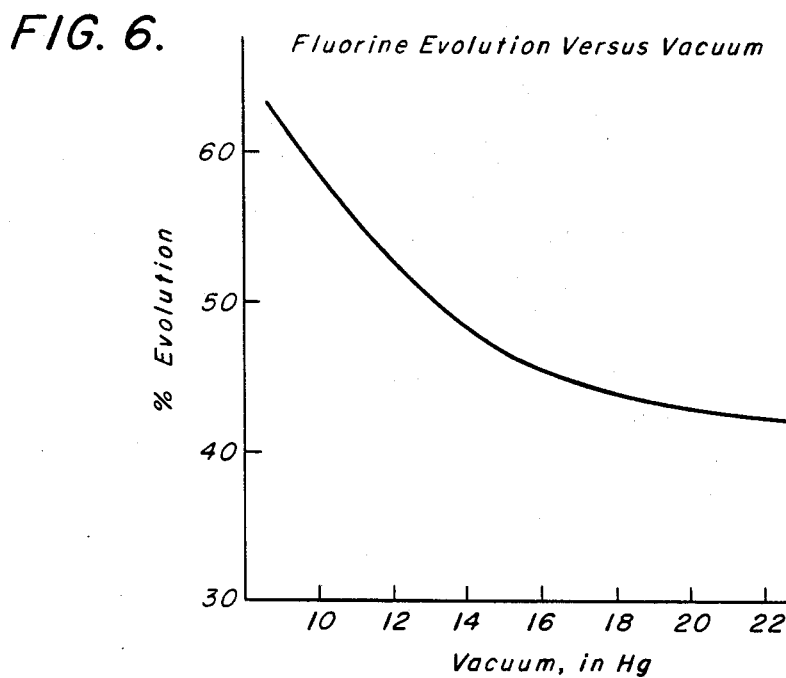
FIG. 6. Fluorine Evolution Versus Vacuum

PRODUCTION OF FLUOSILICIC ACID

BACKGROUND OF THE INVENTION

The wet process for the manufacture of phosphoric acid utilizes as raw materials sulfuric acid and phosphate rock. The main constituent of North American phosphate ore is the mineral fluorapatite, $3Ca_3(PO_4)_2 \cdot CaF_2$, which has a $F:P_2O_5$ ratio of about 0.09. In past years only the phosphorus values in the mineral have been utilized, the fluorine being considered a contaminant that was not worth recovering. During the last two decades, however, the strong trend toward high analysis fertilizer compositions, such as triple superphosphate and ammonium phosphates obtained from wet process phosphoric acid has accelerated the introduction of fluorine scrubbing systems, partly for pollution control and partly for recovery and sale of fluosilicic acid and fluosilicate salts.

When the phosphate rock is digested with a strong mineral acid, the fluorine is released and forms hydrofluoric acid. The hydrofluoric acid thus produced reacts immediately with the silica that is always associated with the phosphate rock to produce fluosilicic acid according to the following reaction.

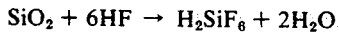

$$SiO_2 + 6HF \rightarrow H_2SiF_6 + 2H_2O$$

The $H_2SiF_6$ is in solution in the phosphoric acid and remains in the product acid unless special procedures are provided for its removal. It is also desirable to recover the fluorine present in other streams in the wet process. For example, after digestion of the phosphate rock, the resulting slurry must be filtered to remove the precipitated calcium sulfate. Phosphoric acid adhering to the filter cake is collected by washing with water or with pond water, which is wash water from the wet process which has been passed into a pond where it is exposed to the elements to bring about evaporation of the water and concentration of $P_2O_5$ and fluorine values. This washing liquor is usually recycled directly to the digestor to up-grade its $P_2O_5$ content.

Known procedures for the recovery of fluosilicic acid utilize the heat of dilution of concentrated sulfuric acid to decompose the fluosilicic acid and evolve the fluorine in the form of silicon tetrafluoride, $SiF_4$. Morris et al., Canadian Chemistry and Metallurgy, August, 1937, describe one such process. Smaltz et al. in two U.S. Pat., Nos. 3,498,746 and 3,498,747, describe a process in which the pond water or recycle streams ('746) from the wet process are contacted with concentrated sulfuric acid to heat the mixture to about 250°F and evolve the fluorine. The concentrated sulfuric acid is diluted to 25 – 70% $H_2SO_4$ ('746) or 40 – 80% $H_2SO_4$ ('747). In the '746 patent, it is suggested that higher fluorine evolution may be obtained by sparging steam into the dilution tank. Bierman, Jr. et al., U.S. Pat. No. 3,615,195, offers a further improvement by preheating the fluorine containing stream and by adding silica to the dilution tank to convert the HF present in the solution to $SiF_4$.

The known procedures however are all deficient in that they provide either only limited recovery of the fluorine values in the recycle streams or suffer from tie in complications with the operation of the phosphate rock digestion plant. The factors which control both the amount of recovery and which lead to tie in complication are (1) the sulfuric acid concentration in the diluter, (2) the heat input to the diluter, and (3) the heat balance of the phosphate plant digestion step.

To achieve a satisfactory level of fluorine evolution, the sulfuric acid concentration in the acid dilution tank should be about 30 to 40 weight percent. However, the quantity of sulfuric acid that may be employed is limited by the requirements of the phosphate rock digestion step. Since the quantity of recycle from the phosphoric acid plant is too large in proportion to the available sulfuric acid to achieve the required minimum acid strength only a portion of the recycle stream can be treated resulting in only a limited quantity of the fluorine in the system being liberated.

The heat input to the dilution step should be as large as possible as the fluorine evolution from the mixed acids increases with increased temperature. However, the residual liquid, after fluorine evolution, must be at a temperature no higher than 200°F before it can be introduced into the phosphate digestion step or the heat balance in the digestor will be disturbed and unsatisfactory gypsum crystal formations will result.

SUMMARY OF THE INVENTION

This invention overcomes these problems and provides an improved process for the recovery of fluosilicic acid which allows (1) a more independent operation of the fluosilicic acid plant from the phosphoric acid plant, (2) provides more heat input at the fluosilicic acid plant without overloading the cooling facilities of the phosphoric acid plant operation, and (3) achieves substantially higher overall fluorine recovery by improved reaction conditions.

These benefits are obtained by using a novel combination of a steam stripping operation conducted at or above atmospheric pressure with a low pressure volatilization step. Modifications of this basic concept, involving adjustment of the fluorine/silica ratio in the stripping vessel, preheating of the input streams, premixing of the input streams and maintenance of a specified sulfuric acid concentration, all serve to increase even further the benefits obtained.

In the process, recycle streams from the sulfuric acid digestion of phosphate ore are mixed with concentrated sulfuric acid in a stripping (dilution) vessel. The heat of dilution of the acid generates in situ. The generated steam acts as a transport medium for the silicon tetrafluoride and hydrogen fluoride present in the recycle streams. Additional steam is added to the vessel to increase the quantity of silicon tetrafluoride and hydrogen fluoride removed. An acid soluble silica compound may be added to form additional silicon tetrafluoride.

The stripped liquor is then introduced into a vacuum chamber where the reduced pressure releases more steam, which in turn carries away residual $SiF_4$ and hydrogen fluoride. At the same time the temperature of the liquor is lowered, thus maintaining the heat balance in the phosphate digestor. In one embodiment of the invention, a portion of the recycle stream is injected directly into the vacuum chamber to provide even more fluorine evolution.

DETAILED DESCRIPTION

Essentially, the process of the present invention comprises four basic steps which provide for the efficient, economical removal and recovery of fluoride values from recycle streams in the wet process for the production of phosphoric acid.

In the first step a portion of the recycle stream is mixed with concentrated sulfuric acid in the stripper-diluter to provide a sulfuric acid concentration in the resulting mixed acids in the range of 20 – 70 weight percent, preferably 25 – 35 weight percent. That portion of the recycle stream not utilized in this step is fed directly into the vacuum chamber at step 2. The heat of dilution of the sulfuric acid produces steam which acts as a transport medium to carry away vaporized $SiF_4$ and hydrogen fluoride. Additional steam may be sparged into the stripper-diluter to carry away additional $SiF_4$ and hydrogen fluoride. Preferably, sufficient quantities of an silica are added to the mixture to provide a fluorine:silica molar ratio of from 5 to 1 to 6 to 1. It is also possible to add impure fluorides or fluosilicates to the mixture of acids to increase the fluorine evolution. Examples of such materials include potassium, sodium and calcium fluosilicate and by-product silicofluorides, such as phosphoric acid reactor scale and solids produced in the concentration of dilute wet process phosphoric acid. Other fluoride materials and ores such as sodium, potassium, calcium or magnesium fluoride and impure fluoride containing acids such as hydrofluoric or fluosilicic may also be added.

In the second step the partly defluorinated liquor from the stripper-diluter is introduced into a vacuum chamber to further evolve fluorine containing compounds and to cool the liquor. In the third step the cooled liquor from the vacuum chamber is recycled to the phosphate rock digestion step. The fourth step consists of recovering the evolved fluorine compounds in the evolved vapors by conventional means.

Figure 1:
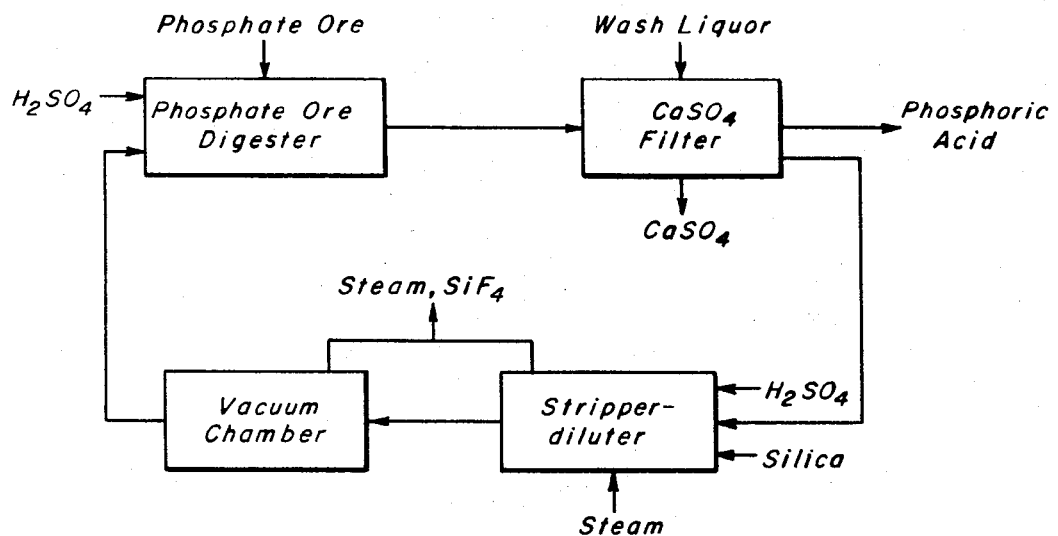

The invention is most easily described by reference to the drawings. FIG. 1 shows the basic embodiment of the invention. A portion of the phosphoric acid containing liquids from the calcium sulfate filter is mixed with concentrated sulfuric acid in the stripper-diluter. Steam may be sparged into the liquor. In conjunction with the in situ generated steam, it strips some $SiF_4$ from the liquor. Silica may be added as necessary to maintain the proper fluorine-silica ratio. The fluorine depleted liquor is sent to a vacuum chamber where steam is generated due to the lower pressure and the vapors containing residual $SiF_4$ are collected.

Figure 2:
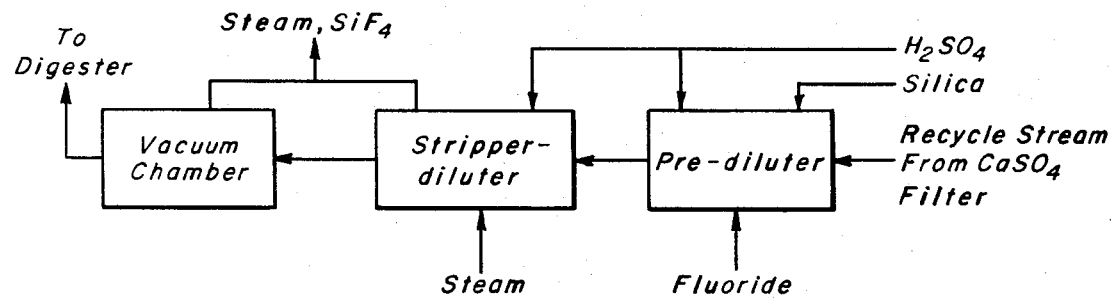

FIG. 2 shows a variation on the recovery procedure. A pre-diluter is placed in the system and the silica and a minor portion (about 10 percent) of the concentrated sulfuric acid are therein mixed with the recycle stream. The advantage of the pre-dilution step is that residual calcium in the recycle stream is precipitated and the subsequent completion of the dilution is more effectively carried out.

Figure 3:
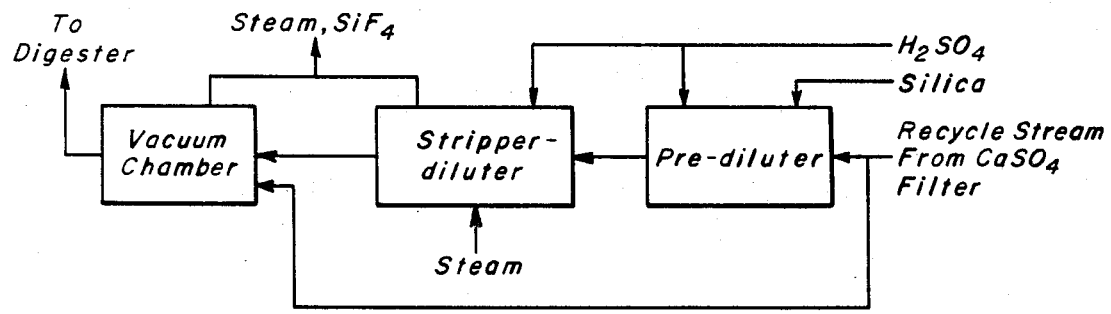

FIG. 3 shows a preferred embodiment of the recovery procedure. A portion of the recycle stream from the calcium sulfate filter is injected directly into the vacuum chamber by-passing the stripper-diluter. This serves to supply more fluorine to the vacuum chamber to obtain the benefit of the steam generated therein.

Figure 4:
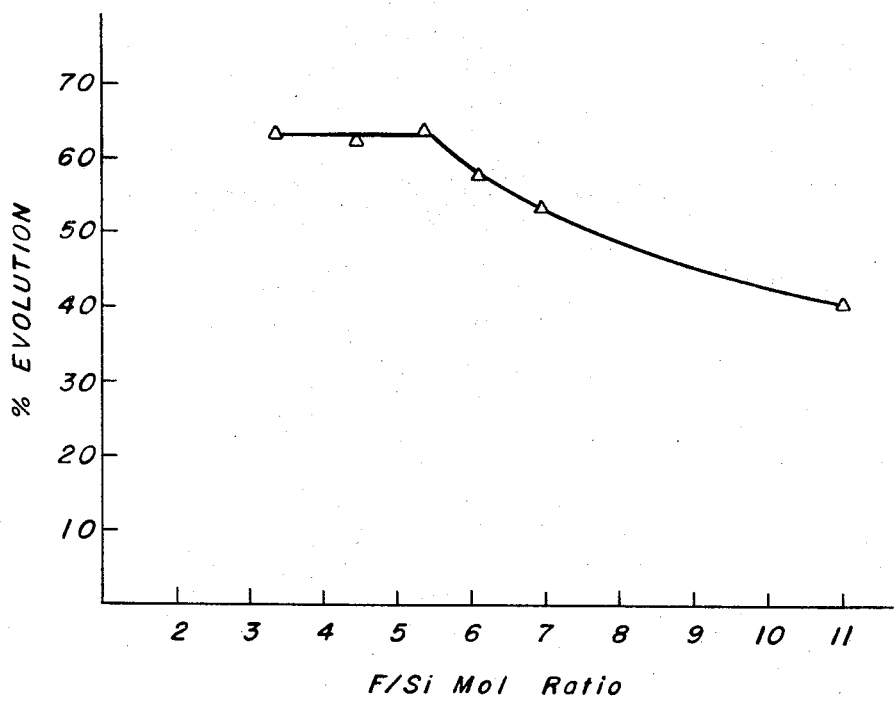

Pond water and recycle streams in the phosphoric acid plant contain the fluorine predominantly in the form of fluosilicic acid. A smaller portion is present as hydrogen fluoride, fluorophosphoric acid, and fluorine complexes of iron and aluminum. The volatilization of the fluorine is most readily accomplished as silicon tetrafluoride. It is therefore advantageous to provide additional silica and/or fluoride if the streams do contain not enough reactive silica in proportion to the fluorine content. An optimal utilization of silica is accomplished at a fluorine-silica molar ratio of about 5 to 1 to 6 to 1 as is evident from FIG. 4, although either higher or lower ratios are also suitable. The addition of silica and/or fluoride is most conveniently achieved at the pre-dilution tank as shown in FIGS. 2 and 3.

Formation of silicon tetrafluoride in the process streams occurs predominantly by decomposition of fluosilicic acid and by reaction of silica or silica derivatives with hydrogen fluoride.

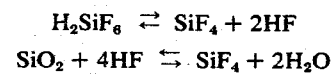

$$H_2SiF_6 \rightleftarrows SiF_4 + 2HF$$

$$SiO_2 + 4HF \rightleftarrows SiF_4 + 2H_2O$$

The reactions are acid catalyzed equilibrium systems. The concentration of silicon tetrafluoride in the liquid and its vapor pressure at ordinary process conditions is very low.

Consequently, the volatilization of fluorine is greatly improved by conditions which provide a transport medium to remove the silicon tetrafluoride from the liquid, and which accelerate the rate of silicon tetrafluoride formation. Such improvement is achieved by applying a steam sparge which accelerates the silicon tetrafluoride removal, and a high acidity which allows a rapid response of the equilibrium to produce more silicon tetrafluoride as it is removed from the system. FIG. 5 demonstrates the effect of steam formation (boiling) on the volatilization of fluorine.

Since steam sparging introduces additional water its application is limited to an amount equal to 0 – 15 weight percent, preferably 5 – 10 weight percent, of the recycle acid. Steam quantities up to 25 weight percent or more may be used but will decrease the fluorine concentration in the vapor thereby lowering the efficiency of the fluosilicic acid recovery system.

The fluorine volatilization increases as the temperature is raised. However, the maximum temperature is limited by equipment considerations. Thus, although the stripper-diluter may be operated at or above atmospheric pressure and at a temperature in the range of 180 – 350°F, the typical operating conditions are atmospheric pressure and a temperature in the range of 230 – 250°F.

The sulfuric acid concentration in the mixed acids is chosen by reference to the overall fluorine recovery. The feed sulfuric acid may have a concentration in the range of 50 percent to fuming, preferably 93 to 99 percent. Highest volatilization is obtained in sulfuric acid concentrations in the stripper-diluter of about 40% $H_2SO_4$. However, this requires the by-pass of a substantial portion of the recycle stream and therefore lowers the quantity of the fluorine containing stream which can be treated. In the present invention, the stripper-diluter may be operated with $H_2SO_4$ concentrations of from 20 to 70 percent, although optimum fluorine yields are achieved by selecting to operate at the lowest satisfactory acid concentration (25 – 35% $H_2SO_4$) and to compensate for the lower heat of dilution by additional heat input such as recycle pre-heating and by flashing the residual liquor in the vacuum chamber. Thus, for the first time a process is provided which treats the entirety of the recycle streams from the phosphoric acid plant.

The sulfuric acid feed stream should be at a temperature in the range of from 50°F to its boiling temperature. Preferably, it should be a temperature in the range of from 180 to 200°F. It may be injected under pressure. The recycle stream from the phosphoric acid plant should be at a temperature in the range of from 100 to 250°F, the higher temperature being used when the stream is pressurized. Preferably, the recycle stream temperature should be in the range of from 210 to 225°F.

The silica source added to the mixed acid is an amorphous silica selected from such compounds as diatomaceous earth, silicic acid, silica, and silicic acid salts.

The stripper-diluter should be run at temperature of from 180 to 350°F, preferably at a temperature of from about 230 to 250°F. The pressure in the vacuum chamber may vary widely. Good results are obtained at 10 to 25 inches Hg, with optimum performance at 15 to 20 inches Hg. The temperature of the feed streams to the vacuum chamber should be from 170 to 240°F, preferably from 185 to 205°F and the temperature of the liquid exiting from the vacuum chamber should be from 180 to 200°F, preferably from 185 to 195°F.

In one embodiment of the invention from 30 to 75 percent of the phosphoric acid recycle stream is added to the stripper-diluter and the remainder directly to the vacuum chamber. Preferably, from 50 to 65 percent of the recycle stream is added to the stripper-diluter.

The invention is further illustrated by the following non-limiting examples.

Example I

Recycle acid (100.0 g.) containing 20.41% $P_2O_5$, 2.44% $SO_4^=$, 1.91% F, and 0.69% $SiO_2$ was mixed with 98% $H_2SO_4$ (50.0 g.) and heated in a plastic vessel under reduced pressure (8 in. vacuum) until 10 percent by weight of the recycle acid was volatilized. The fluorine to silica mole ratio was varied by addition of dry silica over a range from 3.4 to 11.1. The following results (FIG. 4) were obtained:

F/$SiO_2$ Mole Ratio: 3.4 5.4 6.2 7.0 11.1
% F Evolution: 63 63 58 53 41

As evident, optimum silica utilization occurs at 5–6 F/Si.

Example II

A mixture of recycle acid and $H_2SO_4$ as described in Example I was adjusted with dry silica to a 5.4 F/$SiO_2$ mole ratio, heated to boiling at 8 in. vacuum, and the volatile material condensed in an ice-cooled trap. The procedure was repeated with different heat inputs to increase the amount of steam formation by boiling, while maintaining a constant distillation time of approximately 20 min. The collected condensate gave the following accumulative results (FIG. 5):

% Distillation[1]: 6.4 10.2 14.5 19.0
% F Evolution: 52 63 73 76

[1]Weight of condensate expressed as percent of recycle acid.

The data indicate that the F evolution is dependent on steam formation, producing more volatile F with increasing distillation.

Example III

A mixture of recycle acid and $H_2SO_4$ as described in Example II was heated to boiling at a rate to achieve approximately 10 percent distillation over a 20-min. period. The procedure was repeated at different pressures to vary the reaction temperature. The results, listed below, demonstrate the higher fluorine volatilization at higher temperatures.

Vacuum, in. Hg: 8.5 13.0 16.0 22.5
Temp., °F: 224 214 202 194
% F Evolution: 63 52 46 44

Example IV

Recycle acid (387.1 g.) containing 24.1% $P_2O_5$, 1.88% $SO_4^=$, 1.83% F, and 0.52% $SiO_2$ was adjusted with silica (1.46 g.) to a F/Si mole ratio of 5.4 and heated to 160°F. The resulting slurry was fed by gravity into a Teflon reactor together with 98% $H_2SO_4$ (193.0 g.) maintained at 100°F. The hot mixture was stirred under adiabatic conditions for 50 min., allowing volatile material to vent at atmospheric pressure. Subsequent flashing of the hot liquid into a vacuum chamber at 15 in. vacuum under adiabatic conditions reduced the fluorine concentration to 0.43% F. The weight loss due to volatilization corresponded to 6.9% of the recycle acid. The F evolution based on the change in concentration was 67.8 percent.

We claim:
1. In a process for recovery of fluorine containing compounds from a phosphate ore having fluoride impurities associated therewith wherein the phosphate ore is digested with sulfuric acid to produce phosphoric acid and precipitated calcium salts, the calcium salts are filtered and the filter cake washed with an aqueous washing liquor to remove adhering phosphoric acid, the resulting phosphoric acid containing aqueous washing liquor is contacted with sulfuric acid to evolve steam and the major portion of the fluorine values, and the acidified, fluorine-depleted washing liquor returned to the digestion step, the improvement comprising:
   a. contacting the washing liquor with sufficient concentrated sulfuric acid to elevate the sulfuric acid concentration of said liquor to a value of from 20 to 70 weight percent, while maintaining the temperature thereof within the range of 230–250°F;
   b. collecting volatilized fluorine compounds consisting essentially of HF and $SiF_4$;
   c. introducing the fluorine depleted liquor from step a) in a vacuum chamber to further evolve said fluorine compounds and decrease the temperature of said liquor to a value no higher than 200°F;
   d. collecting volatilized fluorine compounds consisting essentially of HF and $SiF_4$; and
   e. recycling the liquor from step c to the phosphate ore digestion step.

2. The process of claim 1 wherein from 0 to 15 weight percent steam is added to the mixture in step a.

3. The process of claim 1 wherein from 5 to 10 weight percent steam is added and the sulfuric acid concentration is elevated to a value of from 25 to 35 weight percent.

4. The process of claim 1 wherein sufficient reactive silica is added in step a to adjust the fluorine:silica molar ratio to from 5 to 1 to 6 to 1.

5. The process of claim 1 wherein a fluoride containing compound is added to the mixture of step a.

6. The process of claim 1 wherein from 30 to 75 percent of the washing liquor is contacted with the sulfuric acid in step a and the remaining portion of the washing liquor is introduced directly into the vacuum chamber in step c.

7. The process of claim 6 wherein from 50 to 65 percent of the washing liquor is contacted with the sulfuric acid in step a and the remaining portion of the washing liquor is introduced directly into the vacuum chamber in step c.

* * * * *